July 24, 1928.
J. L. MESPLE
1,678,155
BRAKE EQUALIZER
Filed Jan. 25, 1926
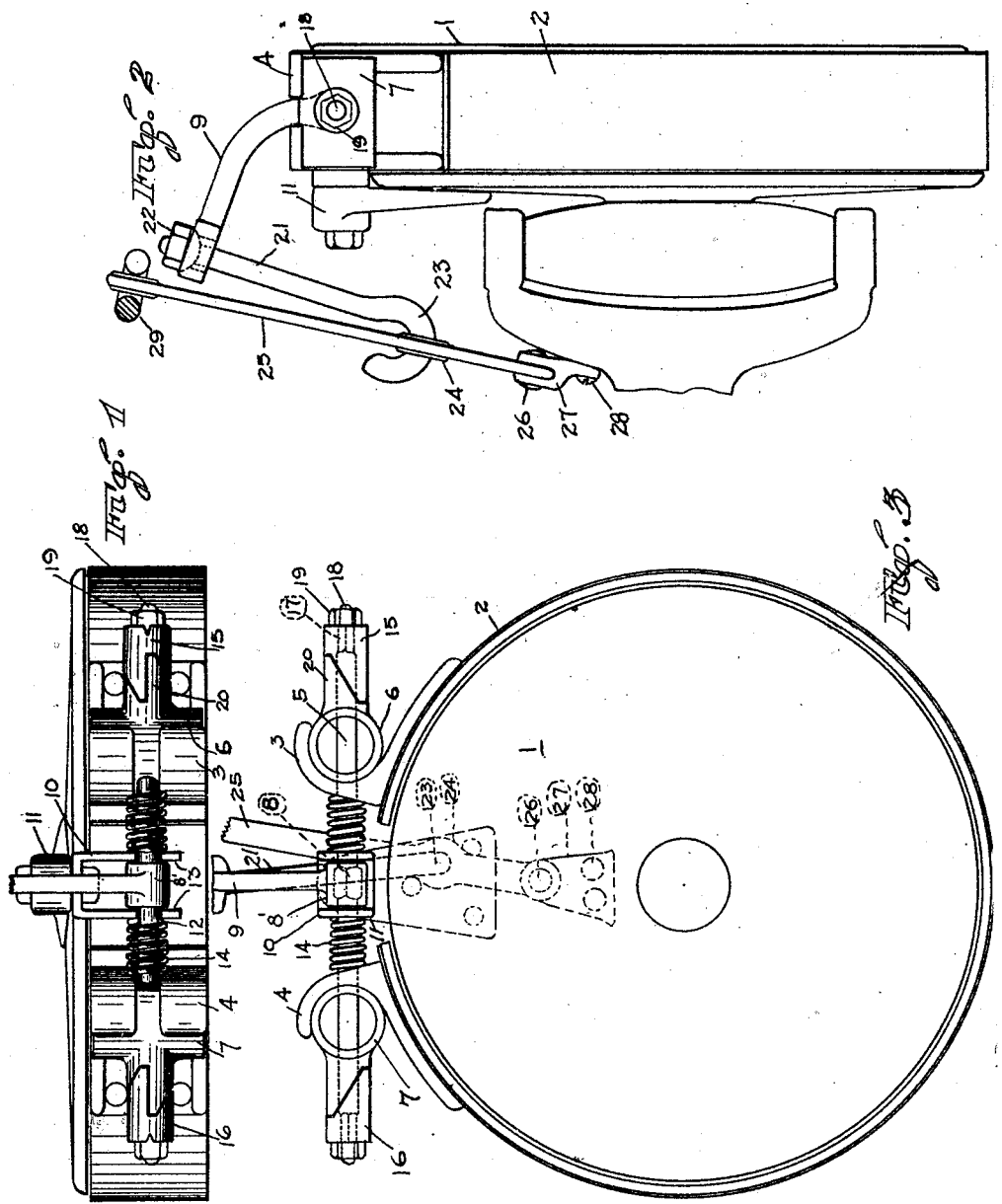
INVENTOR
J. L. MESPLE
BY *[signature]* ATTY.

Patented July 24, 1928.

1,678,155

UNITED STATES PATENT OFFICE.

JOHN L. MESPLE, OF SAN FRANCISCO, CALIFORNIA.

BRAKE EQUALIZER.

Application filed January 25, 1926. Serial No. 83,486.

This invention relates to improvements in motor vehicle brake mechanisms and more particularly to an equalizing means which is combined with the wheel carried brake mechanism in a novel manner so as to provide a simple and compact arrangement which will operate the brakes and also equalize the braking force in such manner that the braking action will be more smooth, even and reliable and the wear on the parts will be uniform.

One of the objects of the invention is to provide a brake equalizing means which is subject to ready incorporation with the usual vehicle brake mechanism.

A further object of the invention is to provide brake equalizing means of the character described which is subject to application to the front as well as the rear wheel brakes of a motor vehicle.

It is a further object of this invention to devise a self wrapping brake in which the force developed by the wrapping action is not added to the applying force thus minimizing any tendency of the brake to chatter.

It is a further object of this invention to devise a brake in which a given applying force will cause the brake band to develop a given braking torque irrespective of the direction of rotation of the brake drum.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Figure 1 represents a top plan view of the brake mechanism of my invention.

Fig. 2 represents a front elevation of said mechanism parts thereof being broken away.

Fig. 3 represents a side elevation of the mechanism as shown applied to front wheel brakes.

It is common practice to provide in vehicle brakes an expansible and contractible band, or similar element, which operates to apply and release the brakes, and my invention comprises a means for operating, that is for expanding or contracting said band and for equally applying the necessary force to the ends of said band whereby the frictional contact of the band with the brake drum will be even, smooth and most effective to bring about the proper operation of the brake mechanism. The particular mechanism of my invention is arranged so that it may be applied to either the front or rear wheel brakes of a motor vehicle. By this arrangement the ordinary brake rigging may be utilized to apply the brakes in the same manner as now common in the art, and simultaneously with the application of the necessary operating force to the brakes an equalization of the braking action will be brought about and therefore the invention may be said to comprise a combined operating and equalizing mechanism.

The embodiment of the invention shown in the drawing comprises a brake drum 1 surrounding which is an expansible and contractible band 2. On the terminals of the expansible and contractible band 2 are lugs 3 and 4 to which the mechanism of my invention is attached.

The mechanism of the invention preferably comprises a rotary and longitudinally shiftable shaft 5 which is rotatably and slidably mounted in transversely extending bearing members 6 and 7 which are engaged with the lugs 3 and 4, said lugs having slots receiving the shaft and also being curved to conform to the shape of the bearing members in order to aid in holding said members in place. The shaft is provided with a squared portion 8 intermediate of its ends, which portion slidably engages in an internally squared sleeve 8', extending upwardly from which sleeve is an operating lever 9. When the lever is rocked the shaft will be turned but is permitted to move bodily in the direction of its length with relation to the sleeve and said bearings. A U-shaped piece 10 is suitably fastened to a stationary part 11 of the brake mechanism and has notches 12 in the arms 13 thereof, in which notches the shaft is rotatably and slidably engaged, the arms being disposed on opposite sides of and serving to maintain the sleeve in proper position.

Mounted on the shaft and disposed between the lugs 3 and 4 and the arms 13 in engagement with both, are expansion springs 14, which serve to normally hold the brake band 2 expanded and in inoperative position.

As a means for causing the brake band to be contracted on rotation of the shaft and for bringing about the equalizing action provided by the mechanism of this invention, I employ in the present instance, cams 15 and 16 which are removably secured to the ends of and adapted to turn with the shaft 5. The shaft 5 is squared as at 17 on its outer ends and the cams 16 have small square openings which receive the squared portions 17. The ends 18 of the shaft are screw threaded and have nuts 19 turned thereon to hold the cams in place. These cams are adapted to engage with similar cams 20 carried by and in the present instance formed integral with the bearings 6 and 7.

When the lever 9 is rocked, the shaft 5 is rotated and the cams 15 and 16 operating against the cams 20 move the lugs towards one another and likewise move the ends of the brake band in the same direction, thereby contracting the brake band. Should one side of the brake band, due to some irregularity thereof, or some irregularity of the brake drum, offer more resistance than the other side, the equalizing action will take place automatically. In this instance, the shaft 5 will shift bodily in the direction of its length relative to the sleeve 8', which is held between the arms 13 of the U-shaped member 10, and this shifting will bring about the equalizing action so that the contracting force applied to the ends of the band will be equal and the braking force as a whole be equalized through those portions of the band which frictionally engage the drum 1. In this way the band is evenly brought into frictional engagement with the drum and the wear on the band and drum is uniform. By causing the band to be uniform and evenly applied to the drum, the lining of the band will last longer and wear uniformly. The operation of applying the brakes will be improved due to the absence of objectionable noises and the tendency of "chattering" of the brakes caused by an uneven wear and an uneven application of the braking force.

With the construction above described the brake band will be self wrapping in its action. Since the rod 5 is free to slide longitudinally of the stationary bracket 10 the wrapping force will not be added to the applying force, thus, minimizing the tendency of the brake to chatter. Because of the symmetrical arrangement of the elements of this brake the wrapping action and therefore the braking torque will be constant for a given force applied to the lever 9 irrespective of the direction of rotation of the drum.

Any suitable means may be provided for connecting the operating lever 9 with the operating mechanism or brake rigging which is controlled and operated by the foot pedal, not shown. In the present instance I have shown as part of this medium of connection between the lever 9 and the brake pedal, a connecting member 21 which has a ball and socket joint connection 22 at its upper end with the free end of said lever. The lower end of the member 21 is provided with a bill 23 similar to that of a hook, which bill extends loosely through an opening 24 provided between the ends of a lever 25. The lever 25 is pivoted as at 26 at its lower end in a suitable clevis 27 which is in turn fastened as at 29 to the axle or some other suitable part of the vehicle. The upper end of the lever is connected to a rod or other similar member 29 which may lead to the ordinary brake rigging, the illustration and detailed description of which latter is thought unnecessary. On the rocking of the lever 25, the member 21 is pulled downward so as to rock the lever 9 connected with the shaft 5 and the shaft rotates and brings about the operation of the brakes and the equalizing mechanism as previously described.

I do not limit myself by any means to the particular means shown and described for rotatably and longitudinally adjustably supporting the shaft upon the brake band and other arrangements other than shown may be employed as desired. Furthermore I wish it understood that while the device of my invention is shown applied to a band which is contracted to apply the brakes it may be attached to any other similar brake element or to an element or band which on expanding will apply the brakes, these changes being within the scope of my invention. Instead of the cams I may employ any other means which will transmit the motion of the shaft to the brake element in accordance with the invention.

The means of my invention having the double function of operating the brake band and equalizing the operating force, is particularly advantageous and an improvement over equalizers such as heretofore used because it may be made up as a part of the wheel carried brake mechanism and is of such size that it takes up practically no more space than the ordinary operating means for contracting or expanding the brake band.

I claim:

1. In a brake adapted to be applied to the front wheel of an automobile, said wheel being secured to the front axle of the automobile by the usual steering knuckle, a brake band, a drum upon the wheel cooperably associated with the band, means including a lever for forcing the band into frictional engagement with the drum, said lever being mounted so as to swing about an axis substantially normal to the axis of said steering knuckle, an actuating member adapted to be moved in a direction substantially normal to the axis of the steering knuckle, and linkage mechanism anchored to the front axle and cooperably associating said lever and actuating member for applying a braking force to said lever.

2. In a brake adapted to be applied to the front wheel of an automobile, said wheel being secured to the front axle of the automobile by the usual steering knuckle, a brake band, a drum upon the wheel cooperably associated with the band, means including a lever for forcing the band into frictional engagement with the drum, said lever being mounted so as to swing about an axis substantially normal to the axis of said steering knuckle, an actuating member adapted to be moved in a direction substantially normal to the axis of the steering knuckle, and linkage mechanism anchored to the front axle and cooperably associating said lever and actuating member for applying a braking force to said lever, said linkage mechanism being applied to said lever at a point substantially in alinement with the axis of said steering knuckle.

3. In a wheel brake, a brake band, a pair of spaced lugs carried by one end of said band, a rod adapted to be removably inserted between said lugs, means for connecting said rod with the other end of said band and means for effecting contraction and expansion of said band upon turning said rod.

4. In a wheel brake, a brake band, a pair of spaced lugs fixed upon each end of said band, a rod adapted to be removably positioned between the lugs of each of said pairs, a pair of members slidably disposed on said rod and adapted to abut the corresponding faces of said lugs, and means cooperably connecting said rod and said members whereby rotation of said rod serves to oppose faces to said pairs of lugs.

JOHN L. MESPLE.